Patented Feb. 28, 1933

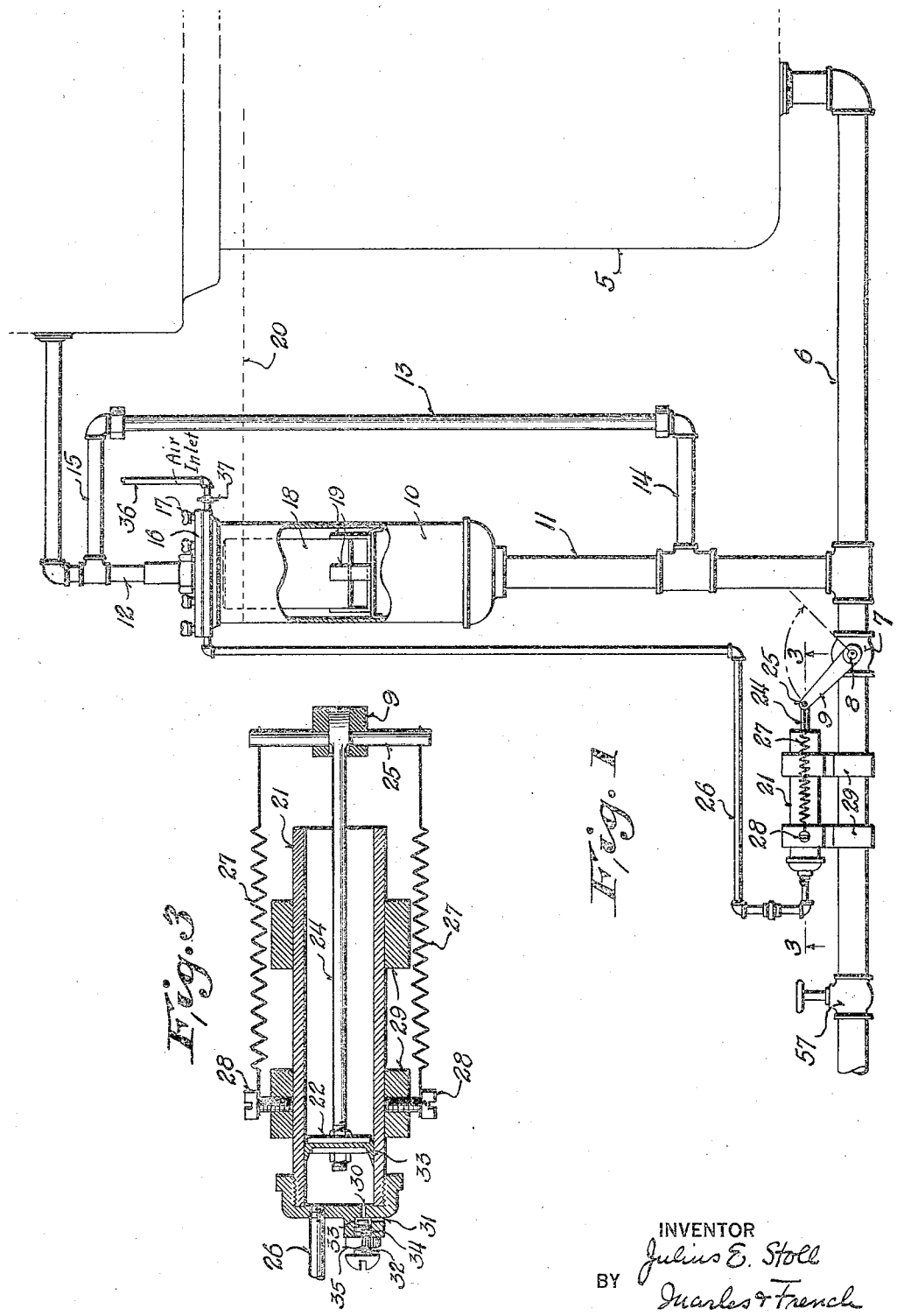

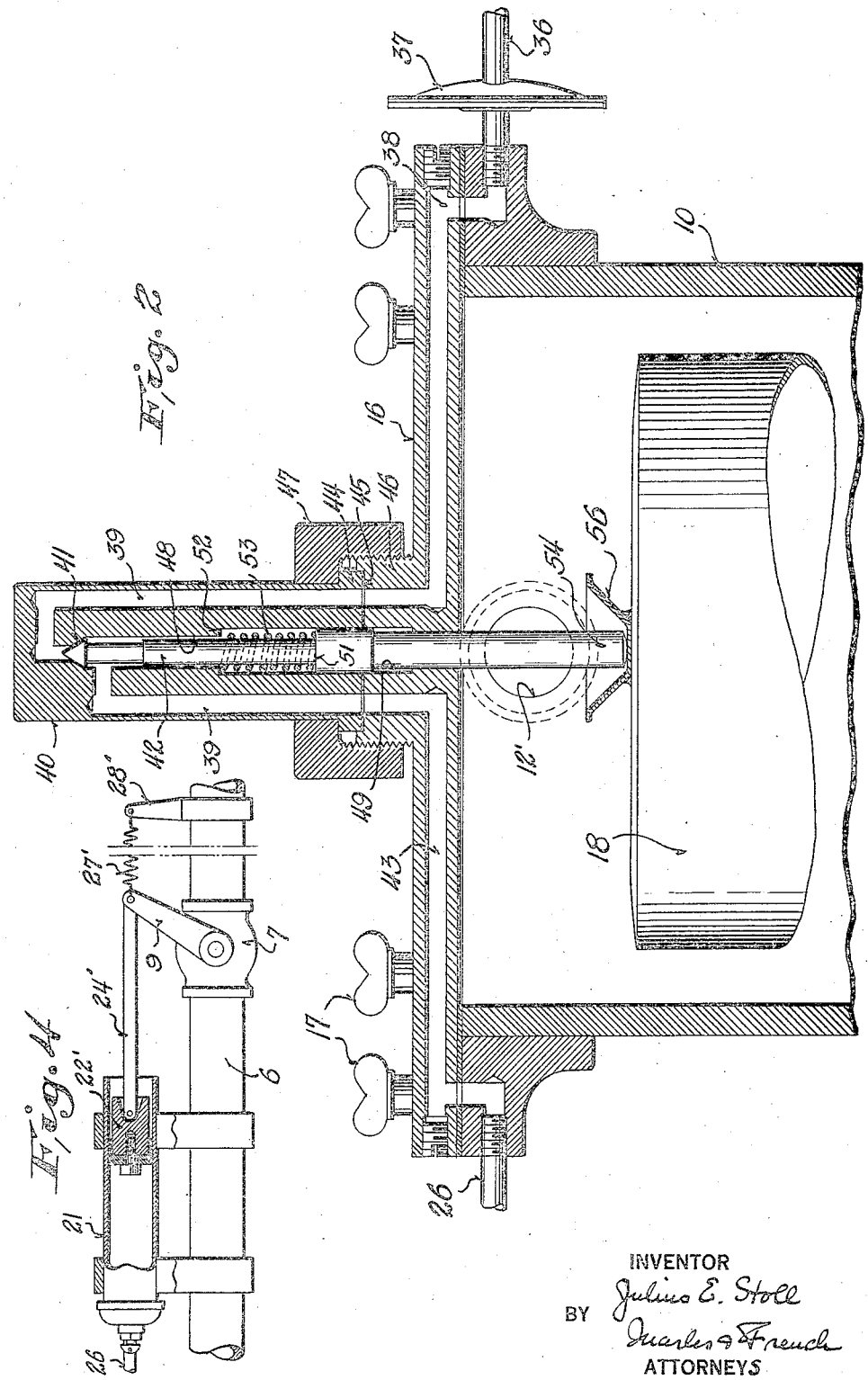

1,899,063

UNITED STATES PATENT OFFICE

JULIUS E. STOLL, OF MILWAUKEE, WISCONSIN, ASSIGNOR TO PABST CORPORATION, OF MILWAUKEE, WISCONSIN, A CORPORATION OF WISCONSIN

LIQUID LEVEL CONTROL APPARATUS

Application filed October 5, 1931. Serial No. 566,990.

The invention relates to liquid level control apparatus.

The object of the invention is to control the level of a liquid in large tanks or containers wherein a valve controlling the supply is automatically shut off or turned on to control the level of the liquid. In devices of this kind the use of a float alone operable through a change of liquid level to control the supply valve has not been found to give satisfactory operation and the present invention has been designed to overcome the difficulties of prior devices and provide a simple but what has been found to be an exceedingly effective combination of parts where the valve controlling the supply to the tank is operated by a fluid pressure operated motor which is controlled by the float.

The invention consists in the several features hereinafter described and more particularly defined by claims at the conclusion hereof.

In the drawings, Fig. 1 is a side elevation view of the apparatus embodying the invention, parts being broken away and parts being shown in section;

Fig. 2 is an enlarged detail vertical sectional view through the float tank;

Fig. 3 is a detail sectional view taken on the line 3—3 of Fig. 1;

Fig. 4 is a detail view of an alternative form of fluid pressure operated means for operating the valve, parts being shown in section.

Referring to the drawings, the numeral 5 designates a tank or other suitable container whose liquid content supplied through the supply pipe 6 is to be controlled by any suitable valve 7 whose operating stem 8 is provided with a lever 9, the valve being of any well known type which is open and closed by the oscillation of the shaft or stem 8.

A float chamber or housing 10 is connected at one end by a pipe 11 to the tank as by connection with the supply tank 6 and at its upper end by a vent pipe 12 communicating with the upper portion of the tank through the opening 12' so that the level of the liquid in the float housing will be the same as that in the tank, this float housing preferably being separate from the tank and arranged outside of the same so that it is readily accessible and so that it may be made as a unit for controlling the supply of liquid to tanks or containers used for various purposes, for example evaporators, boilers, storage tanks, etc.

A liquid level gauge 13 is connected in circuit with the tank through pipe connections 14 and 15 connected respectively with the pipes 11 and 12.

The float housing 10 is provided with a removable head or cover 16, removably secured in a liquid tight manner by clamping bolts or studs provided with the nuts 17 and a float 18 of any approved form is arranged to move in said housing and is guided in its up and down movements therein by a skeleton guide frame 19 secured to the sides of the tank, said float moving up and down in said housing in accordance with the change in liquid level therein which in turn corresponds to the change in liquid level in the tank 5 and indicated by the dotted line 20.

The valve 7 is not directly operated by the float but is operated by a fluid pressure operating motor of any suitable construction. One simple form of motor is shown in Figs. 1 and 3 and includes a motor cylinder 21, a piston 22 mounted to reciprocate in said cylinder including a suitable flexible packing 23 which permits a certain angular movement of the piston rod 24 which is pivotally connected by a pin 25 to the outer or free end of the lever 9. The fluid medium which may be water, steam or air, but preferably compressed air, is introduced into the head end of the cylinder through a pipe 26 to act on the piston 22 to move the valve to open position and in the case of compressed air, the return or closing movement of the valve is accomplished by tension springs 27 which is connected at one of their ends to the ends of the pin 25 and at their other end by screws 28 to one of a set of brackets 29 secured to the cylinder 21 and supporting it by suitable connection with the supply pipe 6. For the return movement of the piston, an adjustable bleed from the cylinder is provided and as shown this bleed includes angularly disposed passages 30 and 31 in the head of the cylinder and a valve 32 working in a bore 33 communicating with these passages and controlling the rate of flow of the air from the passage 30 to the passage 31, said valve having threaded engagement at 34 with the bore 33 and being in the form of a screw which may be locked in adjusted position by a lock nut 35.

Referring to Fig. 2, means are provided for controlling the operation of the fluid pressure operated motor by the float 18 and in this connection the numeral 36 designates a pipe connected with any suitable source of compressed air supply and having an air strainer 37 therein, said pipe delivering to a passage 38 formed partly in the top flange of the housing 10 and partly in the cover 16, this passage 38 communicating with one end of the valve controlled passage 39 in a valve housing 40, said passage having a valve seat 41 therein intermediate its ends controlled by a needle valve 42 which is controlled by the float 18. The other end of the passage 39 connects with a passage 43, similar to the passage 38 and which passage 43 is connected by the pipe 26 to the fluid pressure operated motor.

The valve housing 40 is of cylindrical form having a flanged end 44 secured in fluid tight engagement with a seat 45 in the upper threaded nipple portion 46 of the cover by a flanged nut 47, said housing 40 having a centrally disposed passage 48 alined with a passage 49 in said cover with the valve free to work in said passages, its stem being guided in a part 50 of the passage 49, said stem also having an annular shoulder 51 formed thereon cooperating with an annular shoulder 52 formed in the passage 48 to form seats for the end of a coiled spring 53 which normally acts to move said valve 42 to an open position. The lower end 54 of the stem bears against the top of the float and preferably works in a cup or socket 56 provided thereon.

With the above construction, when the level of the liquid in the tank 5 recedes below the desired level 20, the valve 42 is opened or held open by the spring 53 to allow compressed air to flow through the pipes 36 and 26, and the passages 38, 39 and 43 to operate the fluid pressure motor and thus move the piston 22 outwardly to cause the rod 24 to swing the valve lever 9 to move the liquid supply valve to an open position, the float 18 under these conditions being at a level to permit this action. As the supply of liquid builds up in the tank 5 and the housing 10, the float 18 rises and as the desired level 20 is approached, the float 18 acts on the valve 42 to close the same to shut off further supply of the operating fluid and as a consequence, the energy built up in the springs 27 incident to opening the valve 7 acts through said spring, pin 25 and lever 9 to close the supply valve, the air being released through the bleed above described. A manually operable shut off valve 57 may also be provided in the supply pipe 6.

With the above construction, it has been found that very close regulation of the liquid level may be obtained as the control consists of but few parts which are readily accessible and may be easily serviced.

Instead of using compressed air as the fluid pressure medium I may use a source of reduced pressure in which event the fluid pressure operated motor is arranged as shown in Fig. 4 and the pipe 26 is the vacuum line controlled by the valve 42 and a very small bleed similar to that shown in detail in Fig. 3 is mounted at the head end of the cylinder. A suitably packed piston 22' has a connecting rod 24' pivotally connected thereto and to the valve operating lever 9 which operates the movable portion of the valve for controlling the passage of liquid through the supply line 6. A spring 27' connected at one end with the piston and at the other with a supporting bracket 28' mounted on the pipe 6 serves to move the piston toward the outer end of the cylinder 21 and acts to close the valve and seal the vacuum, when on, serving to cause the piston 22 to move forwardly in the cylinder and through the connecting rod 24 and arm 9 to open the valve and controlled in the same way that the first described construction using the compressed air in the cylinder is controlled.

I desire it to be understood that this invention is not be limited to any particular form or arrangement of parts except in so far as such limitations are included in the claim.

What I claim as my invention is:

In a liquid level control apparatus of the type wherein a float controlled valve controls the operation of a fluid pressure motor which in turn controls the liquid supply valve, the combination with the float chamber and a float movable therein, of a head for said chamber provided with a centrally disposed bore and radially disposed passages extending to a position adjacent said bore, a tubular casing member having a centrally disposed bore provided with a valve seat and passages extending from said valve seat and communicating with said radially disposed passages, means for clamping said casing member to the head in fluid tight relation therewith, a needle valve working in said bores and controlling the passage of motive fluid through said passages past said seat, a spring mounted in said casing member and normally acting to unseat said needle valve, said needle valve having its stem extending beyond said bores for movement by said float to close said needle valve.

In testimony whereof, I affix my signature.

JULIUS E. STOLL.